United States Patent [19]

Asano et al.

[11] Patent Number: 5,063,738

[45] Date of Patent: *Nov. 12, 1991

[54] PRESSURE GENERATION AND RESPONSIVE MECHANISM WITH HIGH VISCOUS FLUID

[75] Inventors: Hiroaki Asano; Masaji Yamamoto, both of Okazaki, Japan

[73] Assignee: Toyoda Koki Kabushiki Kaisha, Kariya, Japan

[*] Notice: The portion of the term of this patent subsequent to Mar. 6, 2007, has been disclaimed.

[21] Appl. No.: 250,091

[22] Filed: Sep. 28, 1988

[30] Foreign Application Priority Data

Sep. 28, 1987 [JP] Japan .................. 62-243248

[51] Int. Cl.⁵ .................. F16D 31/00; B60K 17/35
[52] U.S. Cl. .................. 60/329; 60/326; 180/249; 192/85 AA; 192/103 F
[58] Field of Search .......... 74/711; 192/58 C, 85 AA; 60/326, 329; 475/85, 87; 180/249

[56] References Cited

U.S. PATENT DOCUMENTS

| | | | |
|---|---|---|---|
| 2,342,414 | 2/1944 | Magill | 60/326 |
| 3,123,169 | 10/1960 | Young et al. | 180/249 X |
| 3,490,312 | 1/1970 | Seitz et al. | 192/85 AA |
| 3,534,633 | 9/1970 | Chocholek | 74/711 |
| 3,628,399 | 12/1971 | Seitz et al. | 74/711 |
| 3,923,113 | 12/1975 | Pagdin | 192/57 X |
| 4,012,968 | 3/1977 | Kelbel | 74/711 |
| 4,031,780 | 6/1977 | Dolan et al. | 192/58 C |
| 4,040,271 | 8/1977 | Rolt et al. | 74/711 |
| 4,048,872 | 9/1977 | Webb | 74/711 |
| 4,058,027 | 11/1977 | Webb | 192/58 C |
| 4,583,626 | 4/1986 | Spridco | 192/103 F X |
| 4,650,028 | 3/1987 | Eastman et al. | 74/650 |
| 4,662,499 | 5/1987 | Jordan | 192/82 T |
| 4,719,998 | 1/1988 | Hiramatsu et al. | 192/103 F |
| 4,727,966 | 3/1988 | Hiramatsu et al. | 192/85 AA |
| 4,730,514 | 3/1988 | Shikata et al. | 74/711 |
| 4,753,308 | 6/1988 | Noto et al. | 180/79.1 |
| 4,762,194 | 8/1988 | Morishita et al. | 180/42 |
| 4,765,425 | 8/1988 | Saito et al. | 180/79.1 |
| 4,784,016 | 11/1987 | Masuda et al. | 74/650 |
| 4,821,604 | 4/1989 | Asano | 192/103 F X |
| 4,829,849 | 5/1989 | Masuda et al. | 74/711 |
| 4,838,119 | 6/1989 | Teraoka et al. | 475/85 |
| 4,905,808 | 3/1990 | Tomita et al. | 192/85 AA |
| 4,921,061 | 5/1990 | Asano | 192/85 AA X |
| 4,966,268 | 10/1990 | Asano et al. | 192/85 AA X |

FOREIGN PATENT DOCUMENTS

| | | | |
|---|---|---|---|
| 0492558 | 4/1982 | France | 180/79.1 |
| 176177 | 11/1924 | Japan . | |
| 772682 | 4/1957 | United Kingdom | 180/79.1 |
| 2038429 | 7/1980 | United Kingdom | 74/711 |

Primary Examiner—Edward K. Look
Assistant Examiner—John Ryznic
Attorney, Agent, or Firm—Oblon, Spivak, McClelland, Maier & Neustadt

[57] ABSTRACT

A pressure generation and responsive mechanism is provided wherein several blade members bodily movable with a first member is received within a space formed in a second member. The second member provides a first flat end surface in friction engagement with the blade members, and an actuation piston, by itself or in cooperation with the second member, provides a second flat end surface in friction engagement with the other ends of the blade members. Silicon oil is filled within several space sections defined by the first and second flat end surfaces and the blade members. When the first member is moved relative to the second member, the blade members compulsorily displaces the silicon oil within the several space sections against friction resistance with the first and second flat end surfaces. Thus, a pressure is generated within each of the several space sections to actuate the actuation piston.

4 Claims, 6 Drawing Sheets

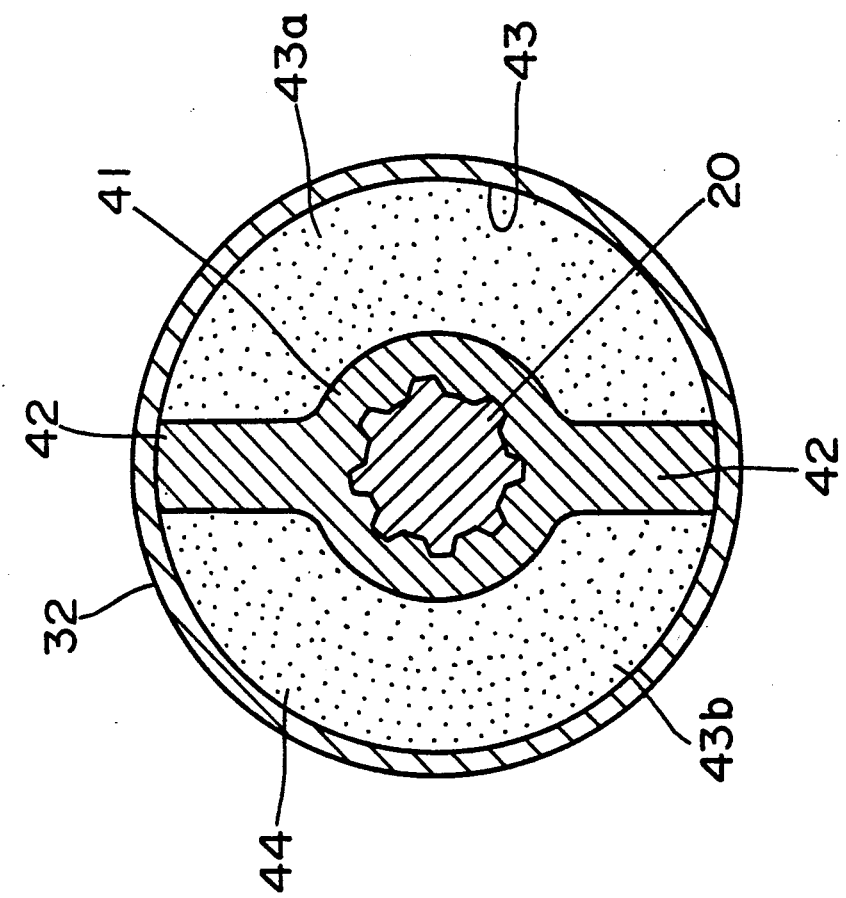

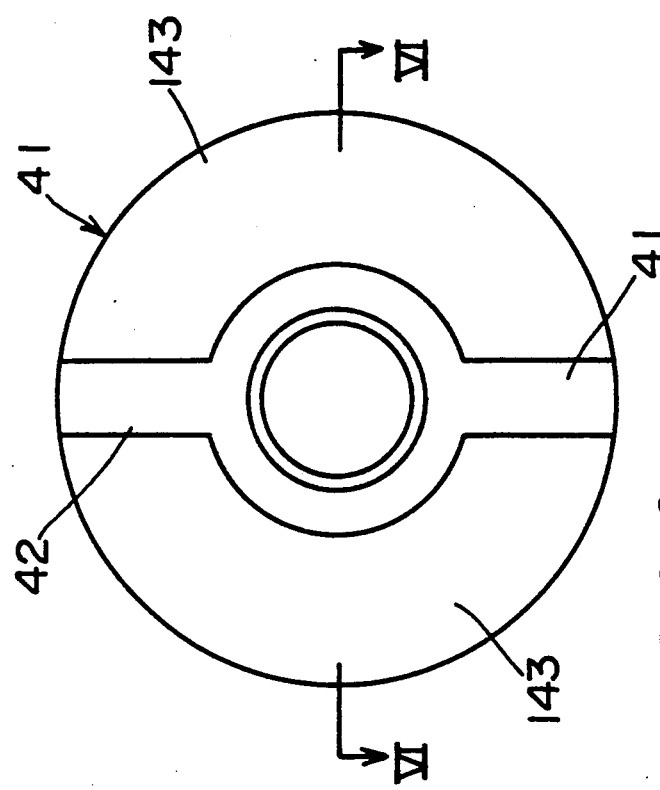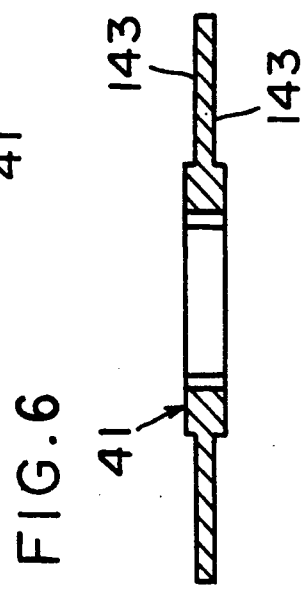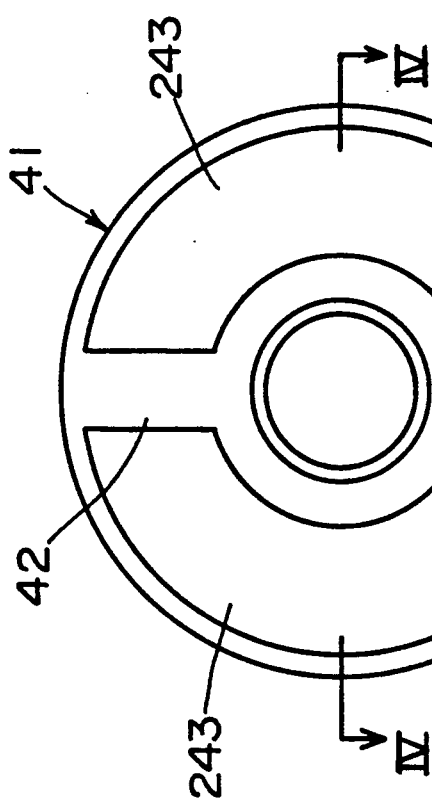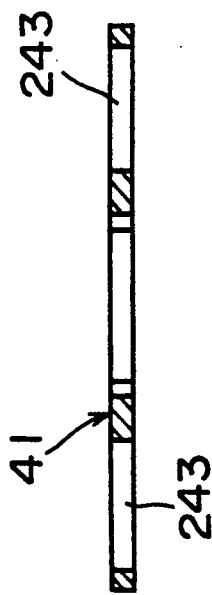
FIG. 5
FIG. 6
FIG. 3
FIG. 4

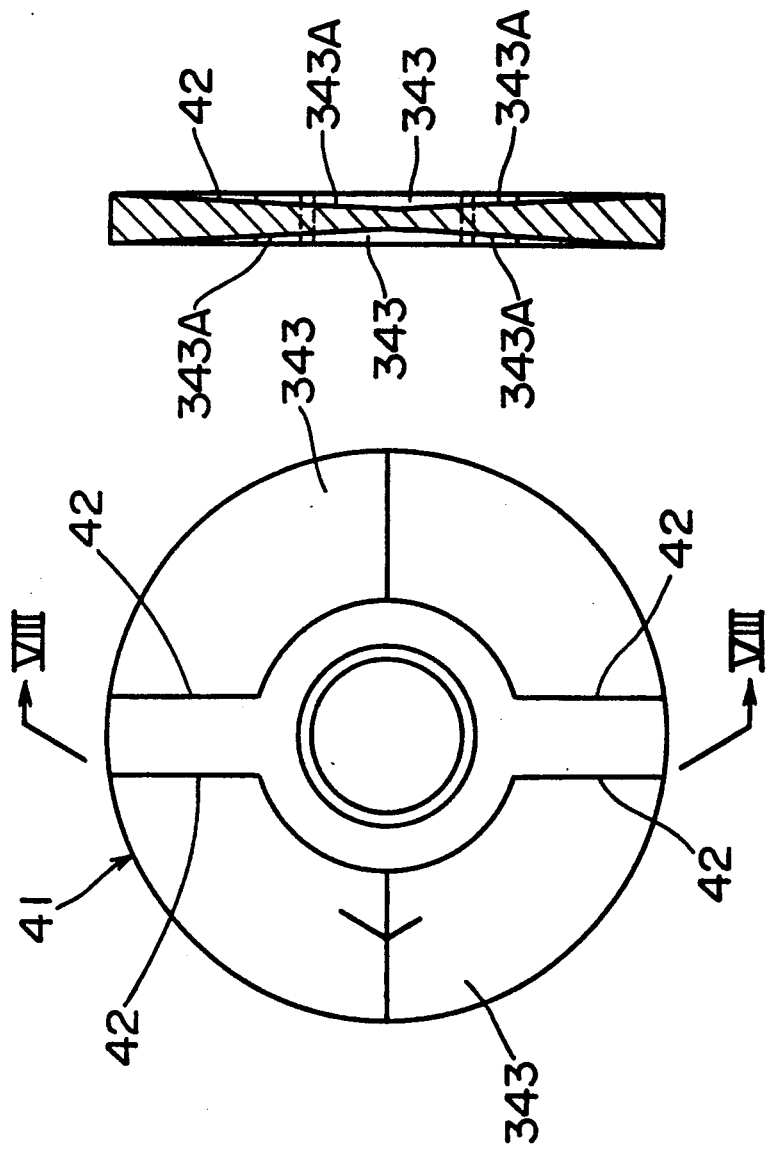

5,063,738

PRESSURE GENERATION AND RESPONSIVE MECHANISM WITH HIGH VISCOUS FLUID

BACKGROUND OF THE INVENTION

1. Filed of the Invention:

The present invention relates to a pressure generation and responsive mechanism for operating an actuator by utilizing a pressure of fluid generated based on the relative movement between two members.

2. Discussion of the Prior Art

In torque transmission devices of the type having a differential pump for use in a four-wheel drive vehicle, the rotational speed difference between two rotational shafts respectively connected to front and rear wheel axles causes the differential pump to operate, and an actuation piston responsive to a pressure which the differential pump generates in correspondence to the rotational speed difference brings a multiple disc clutch into an operating state to drivingly connect the two rotational shafts with each other, whereby a driving torque can be transmitted between the front and rear wheel axles.

Thus, in the torque transmission devices of this type, the differential pump has to be interposed between the front and rear wheel axles, and moreover, oil passages have to be formed to lead the discharge oil from the differential pump to the multiple disc clutch. This makes the device complicated in configuration and enlarged in size, thereby resulting in an increased manufacturing cost.

SUMMARY OF THE INVENTION

Accordingly, it is a primary object of the present invention to provide a pressure generation and responsive mechanism suitable for use in a torque transmission device of, preferably, a four-wheel drive vehicle.

Another object of the present invention is to provide an improved pressure generation and responsive mechanism which, in generating a pressure, does not utilize any variation in volume of a pressure generation space, but utilizes the viscosity of a high viscous fluid filled within the pressure generation space.

A further object of the present invention is to provide an improved pressure generation and responsive mechanism of the character set forth above which is capable of excluding any fluid passage which may otherwise be required to apply a pressure generated in a pressure generation space to an actuation piston.

A still further object of the present invention is the provision of an improved pressure generation and responsive mechanism of the character set forth above which is simple in configuration, reliable in operation and low in manufacturing cost.

Briefly, a pressure generation and responsive mechanism according to the present invention comprises first and second members relatively movable to each other. One of the first and second members is formed therein with a space which receives several blade members bodily movable with the other of the first and second members. A high viscous fluid is filled within several space sections defined by the first member and the blade members. When relative movement occurs between the first and second members, the viscous fluid is compulsorily displaced by the blade members within each of the several space sections against its viscosity, whereby a pressure is generated within each of the several space sections. An actuation piston is further provided to be subjected to the pressure so generated and is actuated in response thereto.

With this configuration, not the variation in volume in each space section, but the viscosity of the high viscous fluid within each space section is utilized to generate a pressure which actuates the actuation piston. Thus, the mechanism for generating the pressure can be made simple in configuration, reliable in operation and low in manufacturing cost. Particularly, in another aspect of the present invention, the actuation piston is arranged to define one end surface for the several space sections. Thus, any passage for leading the pressure to the actuation piston becomes unnecessary, whereby the mechanism can be further simpler in configuration.

BRIEF DESCRIPTION OF THE ACCOMPANYING DRAWINGS

Various other objects, features and many of the attendant advantages of the present invention may be readily appreciated as the same becomes better understood by reference to the following detailed description of the preferred embodiments when considered in connection with the accompanying drawings, wherein like reference numerals designate identical or corresponding parts throughout the several views, and in which:

FIG. 2 is a cross-sectional view of the device taken along the line II—II in FIG. 1;

FIG. 3 is a front view of another modified form of the rotor;

FIG. 4 is a sectional view of the rotor taken along the line VI—VI in FIG. 3;

FIG. 5 is a front view of still another modified form of the rotor;

FIG. 6 is a sectional view of the rotor taken along the line VI—VI in FIG. 5;

FIG. 7 is a front view of a further modified form of the rotor;

FIG. 8 is a sectional view of the rotor taken along the line VIII—VIII in FIG. 7;

DETAILED DESCRIPTION OF THE PREFERRED EMBODIMENTS

Figure 11:
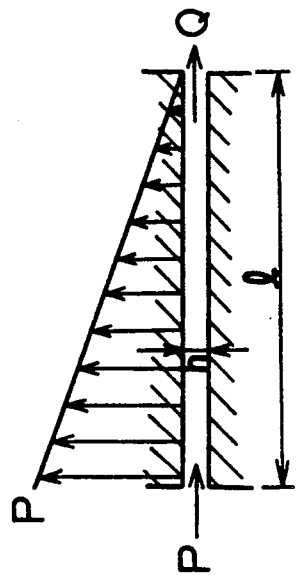
FIGS. 11 and 12 are explanatory views illustrating the operational principle of the pressure generation and responsive mechanism according to the present invention.

Referring to the drawings and particularly to FIG. 11 thereof, there is illustrated a principle based on which a mechanism according to the present invention generates a pressure. When a viscous fluid flows passing through a relatively limited space with a width (b), a length (l) and a clearance (h), under the pressure difference P, the flow volume Q and the pressure P can be calculated using the following equations (1) and (2), respectively.

$$Q = \frac{P \cdot b \cdot h^3}{12 \cdot \mu \cdot l} \quad (1)$$

$$P = \frac{12 \cdot Q \cdot \mu \cdot l}{b \cdot h^3} \quad (2)$$

Figure 13:
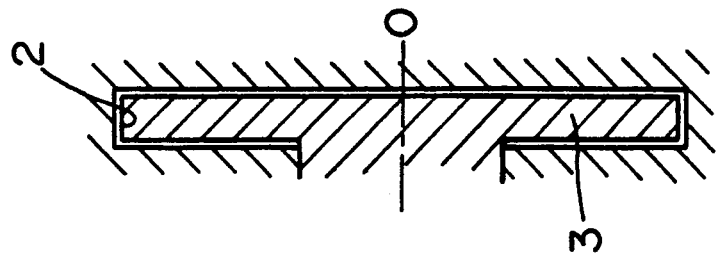
FIG. 13 is a sectional view of the mechanism taken along the line XIII—XIII in FIG. 12.
Figure 12:
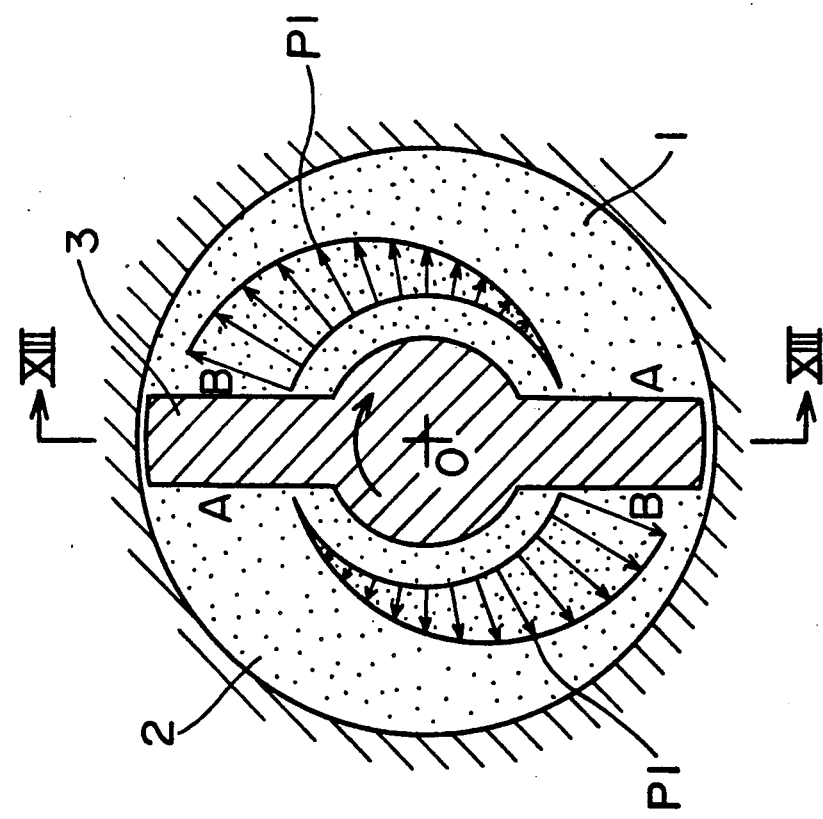

Thus, as shown in FIGS. 12 and 13, where a rotor 3 with two radially extending blades is received within a cylindrical space 2 filled with a high viscous fluid 1 and where the rotor 3 is rotated about the axis of the space 2, the viscous fluid 1 filled within the space 2 is compulsorily displaced at a flow rate which corresponds to the rotational speed of the rotor 3, so that the viscous friction of the fluid 1 with two flat end walls causes a pressure to be generated within the space 2. Let it be now assumed that the rotor 3 rotates in the direction indicated by the arrow and that a rotationally preceding one of the two blades defining each of two semi-circular space sections is designated as A, while the other blade rotationally following is designated as B. Then, the pressure generated within each space section becomes the highest at the point B and the lowest at the point A, as represented by the pressure distribution chart in FIG. 12, and the pressure so generated is in proportion to the rotational speed of the rotor 3. The pressure can be utilized as the power to move an actuation piston not shown.

Description will then be made with embodiments of the present invention which are applied to a torque transmission device for a four-wheel drive vehicle.

Figure 1:
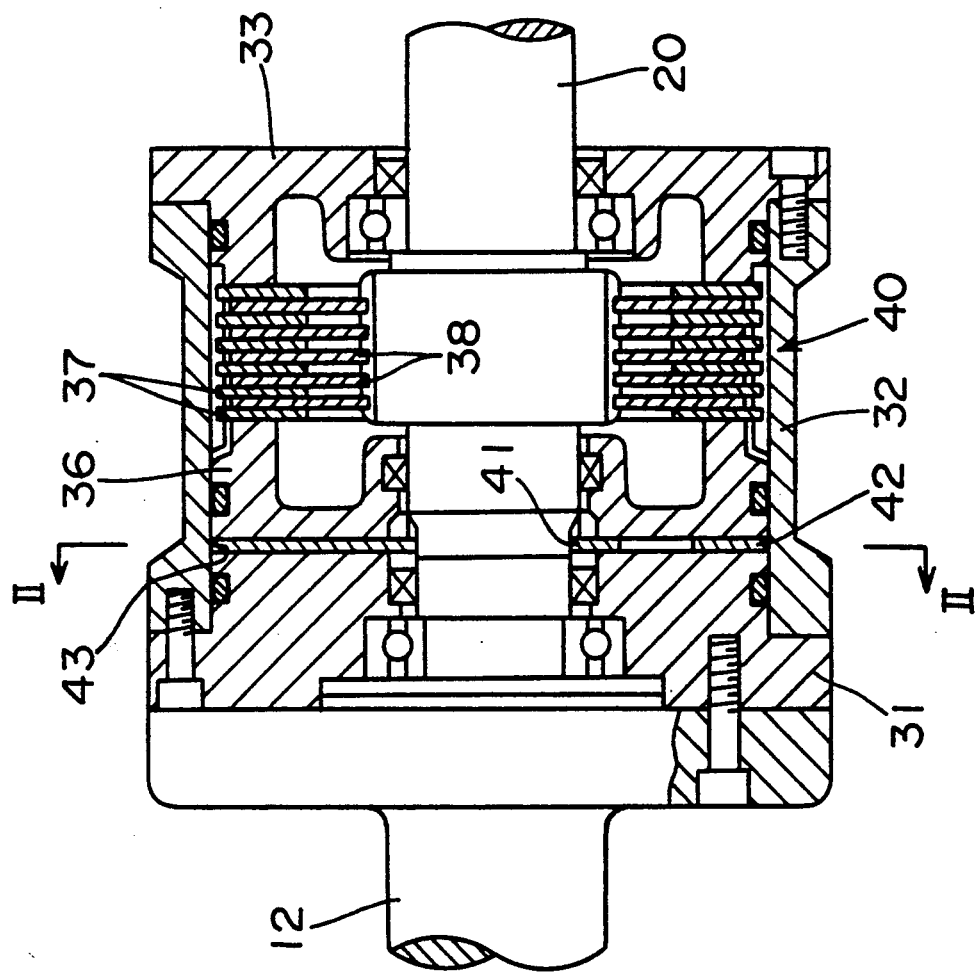
FIG. 1 is a sectional view of a torque transmission device for a four-wheel drive vehicle which device incorporates a pressure generation and responsive mechanism according to the present invention.

Referring now to FIG. 1, a torque transmission device is shown having a first rotary shaft 12 connectable to front wheels of the four-wheel drive vehicle and a second rotary shaft 20 connectable to rear wheels. One end of the first rotary shaft 12 has secured thereto an end cap 31, to which a cylinder housing 32 is secured at one end thereof in co-axial relation with the first rotary shaft 12. Another end cap 33 is secured to the other end of the cylinder housing 32. The end caps 31 and 33 rotatably support one end portion of the second rotary shaft 20 in axial alignment with the first rotary shaft 12.

A plurality of outer clutch plates 37 are spline-engaged with an internal surface of the cylinder housing 32, while a plurality of inner clutch plates 38 are spline-engaged with an outer surface of the second rotary shaft 20. The outer and inner clutch plates 37, 38 are disposed in alternte fashion to constitute a multiple disc clutch 40. Also within the cylinder housing 32, an actuation piston 36 bodily rotatable with the cylinder housing 32 is slidably disposed between the multiple disc clutch 40 and the end cap 31 and is moved responsive to a pressure applied thereto so as to pressure the clutch discs 37, 38 on one another. As a result, the rotational torque applied to the cylinder housing 32 through the first rotary shaft 12 is transmitted to the second rotary shaft 20 through the multiple disc clutch 40. However, the rotational torque transmitted to the second rotary shaft 20 is varied depending upon the pressure acting on the actuation piston 36.

At one axial side of the actuation piston 36, an axially narrow cylindrical space 43 is defined between the actuation piston 36 and the end cap 31. A rotor 41 which is slightly smaller in axial width than the cylindrical space 43 is rotatably received within the cylindrical space 43 and is in friction or sliding engagement with the opposing flat end surfaces of the actuation piston 36 and the end cap 31. As shown in FIG. 2, the rotor 41 is spline-engaged at its center portion with the outer surface of the second rotary shaft 20 and is formed with a plurality (two in this illustrated embodiment) of blades 42 which radially outwardly protrude at diametrically opposite sides. Preferably, the number of the blades 42 may be in the range of two through four. Radially outer end surfaces of the blades 42 are in sliding engagement with an internal surface of the cylinder housing 32 to constitute sealing portions. Thus, the cylindrical space 43 between the actuation piston 36 and the end cap 31 is circumferentially divided by the blades 42 into two sector space sections. Each of these space sections 43a, 43b are filled with a high viscous fluid 44 such as silicon oil.

In operation, when relative rotation occurs between the first and second rotary shafts 12 and 20, the rotor 41 is rotated within the cylinder housing 32. The viscous fluid 44 filled in the space sections 43a, 43b is compulsorily displaced by the blades 42 through between the two flat end surfaces of the end cap 31 and the actuation piston 36 at a flow rate corresponding to the rotational speed difference. In this event, the viscous friction of the fluid 44 with the flat end surfaces of the end cap 31 and the actuation piston 36 causes the fluid 44 to remain, whereby a pressure proportional to the rotational speed difference is generated within each of the space sections 43a, 43b. Because the flat end surface of the actuation piston 36 defines the space 43, the pressure so generated is directly exerted upon the actuation piston 36, which is hence axially moved to pressure the clutch discs 37, 38 upon one another. Consequently, the rotational torque acting on the first rotary shaft 12 is transmitted to the second rotary shaft 20 through the multiple disc clutch 40.

Other embodiments of the present invention will be described hereafter with reference to FIGS. 3-8.

These embodiments feature various modifications of the rotor 41 with the blades 42, and thus, same reference numerals are used to designate those parts which perform the identical or corresponding functions.

In another modification shown in FIGS. 3 and 4, the rotor 41 is different from that shown in FIG. 3 in that two sector through holes 243, 243 which are circumferentially partitioned by the blades 42 are formed in the rotor 41.

In still another modification shown in FIGS. 5 and 6, the rotor 41 is modified by removing such a pair of circumferential edge portions as provided in the modification shown in FIG. 3.

In a further modification shown in FIGS. 7 and 8, two step-down spaces or cavities 343, 343 of V-shape in section whose depth gradually varies in the rotational direction are formed at the axial opposite ends of the rotor 41. In this particular instance, two bottom surfaces 343A of each cavity 343 which are slanted towards the circumferential mid portion between the blades 42, 42 act to compulsorily displace the viscous fluid.

The torque transmission devices with these modifications shown in FIGS. 3 through 8 perform substantially the same function as that shown in FIGS. 1 and 2. However, the devices incorporating those modifications shown in FIGS. 5 and 7 are particularly advantageous in that the pressures generated at axial opposite sides of the rotor 41 act to hold the same at an axial position where they are balanced.

Figure 9:
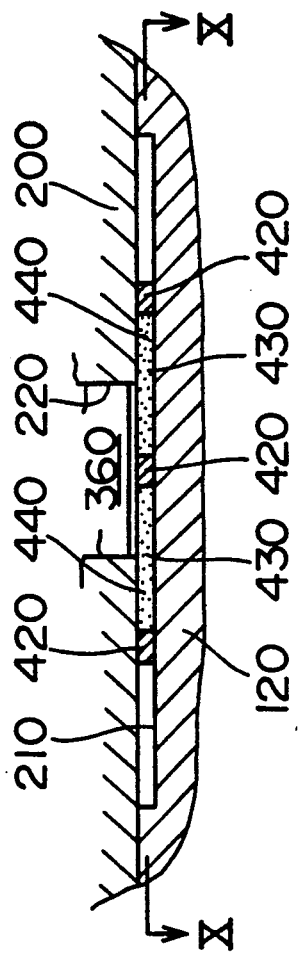
FIG. 9 is a fragmentary sectional view of another pressure generation and responsive mechanism constituting another embodiment of the present invention.
Figure 10:
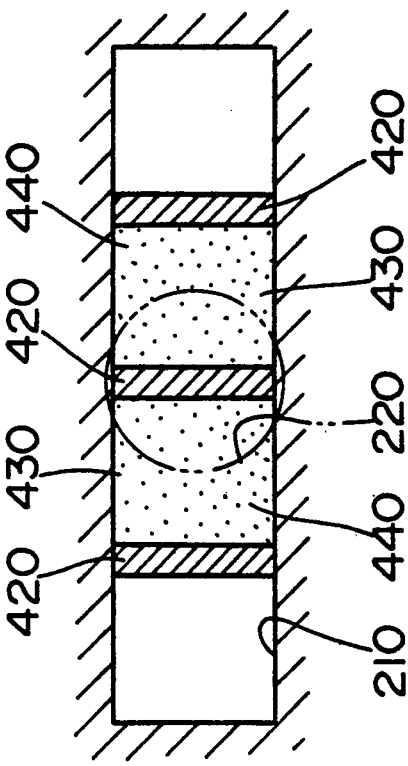
FIG. 10 is a fragmentary sectional view of the mechanism taken along the line X—X in FIG. 9.

Referring then to FIGS. 9 and 10, there is shown another mechanism which generates a pressure to operate an actuation member by utilizing linear relative motion between two members.

More specifically, a first sliding member 120 mounts thereon a second sliding member 200 which is slidable relative thereto in the left-right direction as viewed in FIG. 9. The first sliding member 120 is formed with a shallow oblong groove 210 at its sliding surface, while the second sliding members 200 has secured to its sliding surface a plurality (three in this particular embodiment) of blades 420 which are received in the oblong groove 210 to extend in a direction (i.e., vertical) transverse to the sliding direction of the sliding members 120, 200. The blades 420 divide the oblong space defined by the sliding members 120, 200 into four oblong space sections, of which the middle two sections 430 are each filled with a high viscous fluid 440 such as silicon oil. Further, the other sliding member 200 is formed therein with a cylinder hole 220 which opens to both of the oblong space sections. An actuation piston 360 is slidably fit in the cylinder hole 220.

In operation, the high viscous fluid 440 filled in the middle two oblong space sections 430 is compulsorily displaced by the blades 420 through the two adjacent flat surfaces, whereby a pressure which corresponds to the speed of the relative linear motion of the sliding members 120 and 200 is generated to operate the actuation piston 360.

Obviously, numerous modifications and variations of the present invention are possible in light of the above teachings. It is therefore to be understood that within the scope of the appended claims, the present invention may be practiced otherwise than as specifically described herein.

What is claimed is:

1. A pressure generation and responsive mechanism comprising:
    a first rotary shaft rotatable about an axis;
    a secondary rotary shaft provided in axial alignment with said first rotary shaft and rotatable about said axis;
    a cylinder housing secured to one end of said first rotary shaft in coaxial relation with said second rotary shaft and having a first end surface transverse to said axis;
    a piston member received in said cylinder housing to be axially movable but non-rotatable relative to said cylinder housing and having a second end surface facing said first end surface in order to define a cylindrical space having a predetermined width in the direction of said axis;
    a rotor drivingly rotatable by said second rotary shaft and disposed within said space, said rotor having at least two blades having a thickness substantially equal to the width of said space in order to define at least two closed space sections partitioned in a circumferential direction, between said first and second end surfaces; and
    a high viscous fluid filled within said at least two closed space sections for generating a pressure when compulsorily displaced by said at least two blades against its viscosity, said pressure serving to axially move said piston member.

2. A pressure generation and responsive mechanism as set forth in claim 1, wherein
    said rotor has a disk-like shape and is formed with at least two sector through holes which are circumferentially partitioned by said at least two blades.

3. A pressure generation and responsive mechanism as set forth in claim 1, wherein said rotor includes:
    said at least two blades extending in radial outward direction at diametrically opposite sides of said rotor; and
    a pair of sector partition walls respectively bridging said at least two blades at an axial mid portion of said rotor in the circumferential direction of said rotor, each of said sector partition walls having a uniform axial width which is thinner than said blades so as to provide a sector space between itself and one of said first and second end surfaces facing thereto.

4. A pressure generation and responsive mechanism as set forth in claim 1, wherein said rotor includes:
    said at least two blades extending in radial outward direction at diametrically opposite sides of said rotor; and
    a pair of sector partition walls respectively bridging said at least two blades at an axial mid portion of said rotor in the circumferential direction of said rotor, each of said sector partition walls having an axial cross section which gradually becomes thinner towards its mid point in the circumferential direction.

* * * * *